(12) United States Patent
Hofrichter et al.

(10) Patent No.: US 9,678,273 B2
(45) Date of Patent: Jun. 13, 2017

(54) DEVICE FOR PROPAGATING LIGHT AND METHOD FOR FABRICATING A DEVICE

(71) Applicant: International Business Machines Corporation, Armonk, NY (US)

(72) Inventors: Jens Hofrichter, Rueschlikon (CH); Daniel S. Jubin, Rueschlikon (CH); Edward W. Kiewra, South Burlington, CT (US); Antonio La Porta, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/727,128

(22) Filed: Jun. 1, 2015

(65) Prior Publication Data
US 2016/0349452 A1    Dec. 1, 2016

(51) Int. Cl.
| G02B 6/26 | (2006.01) |
| G02B 6/24 | (2006.01) |
| G02B 6/122 | (2006.01) |
| G02B 6/12 | (2006.01) |

(52) U.S. Cl.
CPC .............. G02B 6/24 (2013.01); G02B 6/1228 (2013.01); G02B 2006/12061 (2013.01); G02B 2006/12069 (2013.01)

(58) Field of Classification Search
CPC ............... G02B 6/24; G02B 6/1228; G02B 2006/12061; G02B 2006/12069
USPC ................ 385/14–15, 31, 39, 42–43, 49–50, 385/129–132
See application file for complete search history.

(56) References Cited

U.S. PATENT DOCUMENTS

| 4,585,299 A * | 4/1986 | Strain ................ G02B 6/1347 216/2 |
| 6,144,779 A | 11/2000 | Binkley et al. |
| 6,677,655 B2 * | 1/2004 | Fitzergald ............... G02B 6/12 257/186 |
| 7,081,648 B2 * | 7/2006 | Tsai ....................... H01L 23/66 257/274 |
| 7,519,257 B2 * | 4/2009 | Lipson ................... B82Y 20/00 385/126 |
| 7,643,710 B1 * | 1/2010 | Liu ........................ B82Y 20/00 385/129 |
| 7,653,281 B2 * | 1/2010 | Stepanov ............... G02B 6/122 385/129 |
| 8,401,345 B2 | 3/2013 | Zheng et al. |

(Continued)

OTHER PUBLICATIONS

Alasaarela et al., "Reduced propagation loss in silicon strip and slot waveguides coated by atomic layer deposition," Jun. 6, 2011, Optics Express 11529, vol. 19, No. 12, revised May 14, 2011; accepted May 25, 2011; published May 31, 2011.

(Continued)

Primary Examiner — Ryan Lepisto
Assistant Examiner — Guy Anderson
(74) Attorney, Agent, or Firm — Scully, Scott, Murphy & Presser, P.C.; Daniel P. Morris

(57) ABSTRACT

A device for propagating light is described, comprising: a substrate having a semiconductor material, an insulating layer, wherein the insulating layer is arranged on the substrate, a recess reaching through the insulating layer and into the substrate, wherein the recess is at least partially filled with a filler material, and a waveguide arranged in or on the filler material.

13 Claims, 9 Drawing Sheets

(56) References Cited

U.S. PATENT DOCUMENTS

| | | | |
|---|---|---|---|
| 8,428,404 B1 | 4/2013 | Shubin et al. | |
| 8,652,934 B1* | 2/2014 | Meade | G02B 6/136 257/506 |
| 8,815,704 B2* | 8/2014 | Meade | G02B 6/136 257/506 |
| 9,002,156 B2* | 4/2015 | Ellis-Monaghan | G02B 6/4214 385/14 |
| 2002/0191916 A1* | 12/2002 | Frish | G02B 6/1228 385/43 |
| 2003/0007719 A1 | 1/2003 | Forrest et al. | |
| 2003/0021568 A1* | 1/2003 | Samara-Rubio | G02F 1/025 385/132 |
| 2004/0114869 A1* | 6/2004 | Fike | G02B 6/124 385/43 |
| 2007/0086718 A1 | 4/2007 | Aoki et al. | |
| 2007/0286552 A1 | 12/2007 | Aalto | |
| 2008/0036020 A1 | 2/2008 | Ko et al. | |
| 2009/0095968 A1 | 4/2009 | Baek et al. | |
| 2009/0324164 A1* | 12/2009 | Reshotko | G02B 6/1228 385/14 |
| 2012/0155797 A1 | 6/2012 | Zhang | |
| 2013/0056442 A1* | 3/2013 | Li | G02B 6/1228 216/24 |
| 2013/0156370 A1 | 6/2013 | Kim et al. | |
| 2013/0181233 A1 | 7/2013 | Doany et al. | |
| 2013/0223789 A1 | 8/2013 | Lee et al. | |
| 2013/0279845 A1* | 10/2013 | Kobrinsky | G02B 6/4245 385/14 |
| 2014/0270642 A1 | 9/2014 | Frish | |
| 2014/0312443 A1* | 10/2014 | Assefa | G02B 6/13 257/432 |
| 2015/0016769 A1* | 1/2015 | Verma | G02B 6/12004 385/14 |
| 2015/0016770 A1* | 1/2015 | Polavarapu | G02B 6/12002 385/14 |
| 2015/0097256 A1* | 4/2015 | Ang | H01L 31/1075 257/432 |
| 2015/0125111 A1* | 5/2015 | Orcutt | G02B 6/122 385/14 |
| 2015/0285996 A1* | 10/2015 | Selvaraja | G02B 6/30 385/14 |
| 2015/0293303 A1* | 10/2015 | Pan | G02B 6/136 385/14 |
| 2015/0309261 A1* | 10/2015 | Kobyakov | G02B 6/305 385/14 |
| 2015/0316720 A1* | 11/2015 | Yang | G02B 6/305 385/14 |

OTHER PUBLICATIONS

List of IBM Patents or Patent Applications Treated as Related.
Office Action dated May 9, 2016 received in U.S. Appl. No. 14/831,383, 18 pages.
Office Action dated Sep. 20, 2016 received in U.S. Appl. No. 14/831,383, 9 pages.
U.S. Appl. No. 14/727,128, filed Jun. 1, 2015.
U.S. Appl. No. 14/831,383, filed Aug. 20, 2015.

* cited by examiner

US 9,678,273 B2

DEVICE FOR PROPAGATING LIGHT AND METHOD FOR FABRICATING A DEVICE

FIELD OF THE INVENTION

The invention relates to a device for propagating light and a method for fabricating a device for propagating light.

BACKGROUND

Photonic devices comprising a semiconductor are widely used in modern telecommunication systems. Typically the light is transmitted in optical fibers. Therefore, the light has to be coupled from a first photonic device into an optical fiber. After transmitting the light in the optical fiber the light has to be coupled back to a second photonic device. Therefore, coupling light from and to an optical fiber is an important aspect in the telecommunication field.

US 2013/0181233 A1 discloses a silicon photonics wafer that includes an active silicon photonics layer, a thin buried oxide layer, and a silicon substrate is received. The thin buried oxide layer is located between the active silicon photonics layer and the silicon substrate. An electrical CMOS wafer that includes an active electrical layer is also received. The active silicon photonics layer of the silicon photonics wafer is flip chip bonded to the active electrical layer of the electrical CMOS wafer. The silicon substrate is removed exposing a backside surface of the thin buried oxide layer. A low-optical refractive index backing wafer is added to the exposed backside surface of the thin buried oxide layer. The low-optical refractive index backing wafer is a glass substrate or silicon substrate wafer. The silicon substrate wafer includes a thick oxide layer that is attached to the thin buried oxide layer.

BRIEF SUMMARY OF THE INVENTION

A device for propagating light comprises: a substrate having a semiconductor material, an insulating layer, wherein the insulating layer is arranged on the substrate, a recess reaching through the insulating layer and into the substrate, wherein the recess is at least partially filled with a filler material, and a waveguide arranged in or on the filler material.

Further, a method for fabricating a device comprises: providing a substrate having a semiconductor material, placing an insulating layer on the substrate, providing a recess reaching through the insulating layer and into the substrate, filling the recess at least partially with a filler material, and arranging a waveguide in or on the filler material.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
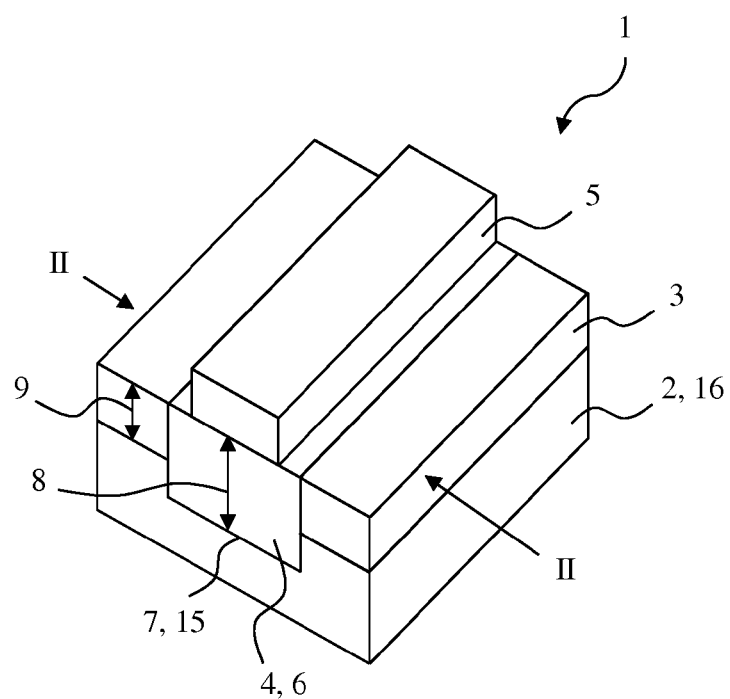
FIG. 1 shows a perspective view of a device for propagating light.

FIG. 1 shows a perspective view of a device 1 for propagating light. The device 1 comprises a substrate 2, an insulating layer 3, a recess 4 and a waveguide 5. The substrate 2 has a semiconductor material 16. The insulating layer 3 is arranged on the substrate 2. As can be seen in FIG. 1 the recess 4 reaches through the insulating layer 3 and into the substrate 2, wherein the recess 4 is filled with a filler material 6. The waveguide 5 is arranged on the filler material 6. For example, the substrate's semiconductor material 16 is oxidized such that the recess 4 filled with the filler material 6, e.g. silicon dioxide, is obtained. The boundary of the recess 4 in the substrate 2 can be defined as the interface 15 between the semiconductor material 16 and the filler material 6.

Further, the recess 4 has a recess bottom 7. A distance 8 between the waveguide 5 and the recess bottom 7 is larger than a thickness 9 of the insulating layer 3. The waveguide 5 is used for propagating light along the waveguide 5.

Figure 2:
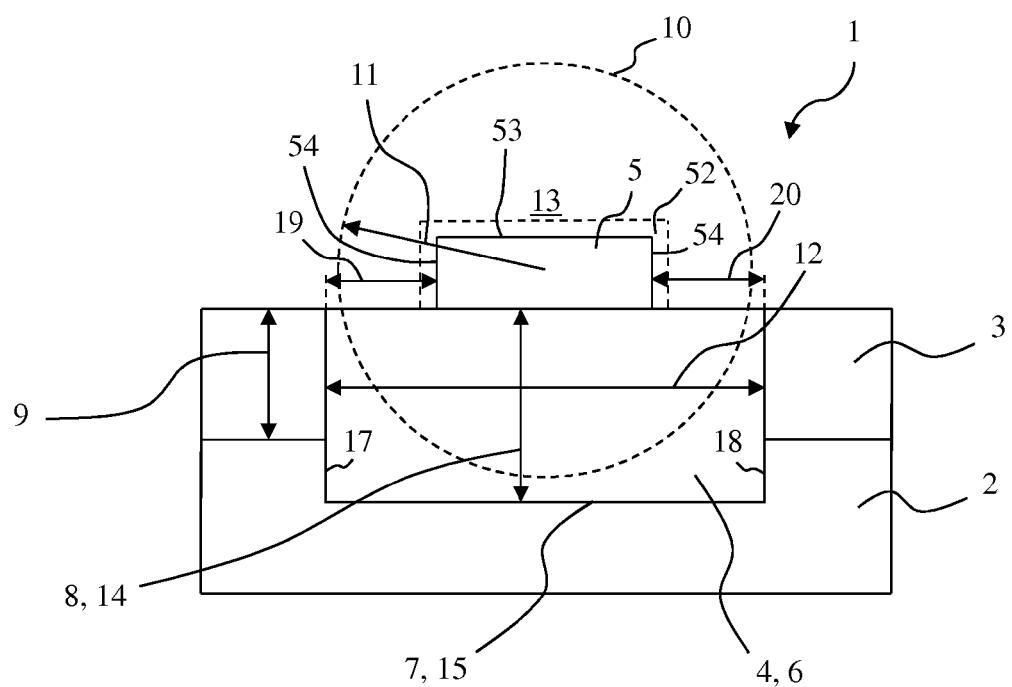
FIG. 2 shows a cross-sectional view of the device for propagating light of FIG. 1.

FIG. 2 shows a cross-sectional view of the device 1 along line II-II of FIG. 1. As can be seen the insulating layer 3 is arranged on the substrate 2. The recess 4 reaches through the insulating layer 3 and into the substrate 2. The light travelling through the waveguide 5 comprises a light mode 10. Part of the light intensity and light mode 10 is within the waveguide 5. However, the light mode will also have a certain intensity outside the waveguide 5. Thereby, the intensity decreases with increasing distance from the waveguide 5. The dotted line illustrates that the light mode 10 has a certain intensity outside the waveguide 5. However, there is no sharp limit or boundary where the light mode 10 does not have any more any intensity. Nearly all intensity of the light mode 10 is within radius 11 of the light mode 10. The radius 11 of the light mode 10 is less than half of the width 12 of the recess 4. Furthermore, the light mode 10 does not reach into the substrate 2.

As can be seen in FIG. 2 the radius 11 of the light mode 10 is larger than the thickness of the insulation layer. If the waveguide 5 would be arranged on the insulation layer 3 in an area far away from the recess 4 than the light mode 10 would reach into the substrate 2. However, because of the recess 4 the light mode 10 does not reach into the substrate 2. Therefore, an attenuation of the light travelling along the waveguide 5 because of the substrate 2 can be avoided. The light mode 10 does not feel the substrate 2 and the absorptive properties of the substrate 2.

The light mode 10 can be completely in the waveguide 5, the filler material 6 and the area 13 above the waveguide 5 and the filler material 6. Therefore, it is important that the filler material does not absorb light or at least does only absorb a very small amount of the light, most preferably the absorption is lower than the absorption of the substrate 2. Because of that the filler material is a non-absorbing material, wherein non-absorbing has the meaning not light absorbing.

The filler material 6 can have a lower index of refraction than the substrate 2. Further, the index of refraction of the filler material 6 can be lower than the index of refraction of the material of the waveguide 5. This helps to confine more light of the light mode 10 in the waveguide 5. As a result this means a lower loss of light due to absorption of light outside the waveguide 5.

The recess 4 can be formed such that a distance 14 between the waveguide 5 and an interface 15 between the semiconductor material 16 and the filler material 6 is larger than a predetermined distance. The predetermined distance can be calculated, for example, when the device 1 is designed. Further, the predetermined distance is the distance which is needed to keep the light mode 10 within the area of the filler material 6. Further, the predetermined distance can be larger than the radius 11 of the light mode 10.

As can be seen in FIG. 2 the recess 4 comprises a first side wall 17 and a second side wall 18. The waveguide 5 can be arranged such that a distance 19 between the waveguide 5 and the first side wall 17 equals a distance 20 between the waveguide 5 and the second side wall 18.

The insulating layer 3 can be a buried silicon dioxide layer. The filler material 6 and the insulating layer 3 can comprise the same material. This material can be silicon dioxide or other materials having a lower index of refraction than the substrate 2. The substrate 2 can comprise silicon. Using these materials allows fabricating the device 1 using the standard complementary metal-oxide-semiconductor technology (CMOS technology).

The waveguide 5 can comprise silicon, polysilicon or a polymer. In an alternative, the waveguide can consist of one of the group of silicon, polysilicon or a polymer. Furthermore, the waveguide 5 can comprise a cladding 52. The cladding 52 is optional and is therefore indicated with a dashed line in FIG. 2. As can be seen in FIG. 2 the cladding is on the top surface 53 and on the side surfaces 54 of the waveguide 5. In an alternative, the cladding 53 is only on the top surface 53 of the waveguide 5. In a further alternative, the waveguide 5 is surrounded by a cladding 52.

The locally increased thickness enables a larger radius 11 of the light mode 10. If the filler material 6 and the material of the insulating layer 3 are the same material than in principle the thickness of the buried oxide layer is locally increased.

Figure 3:
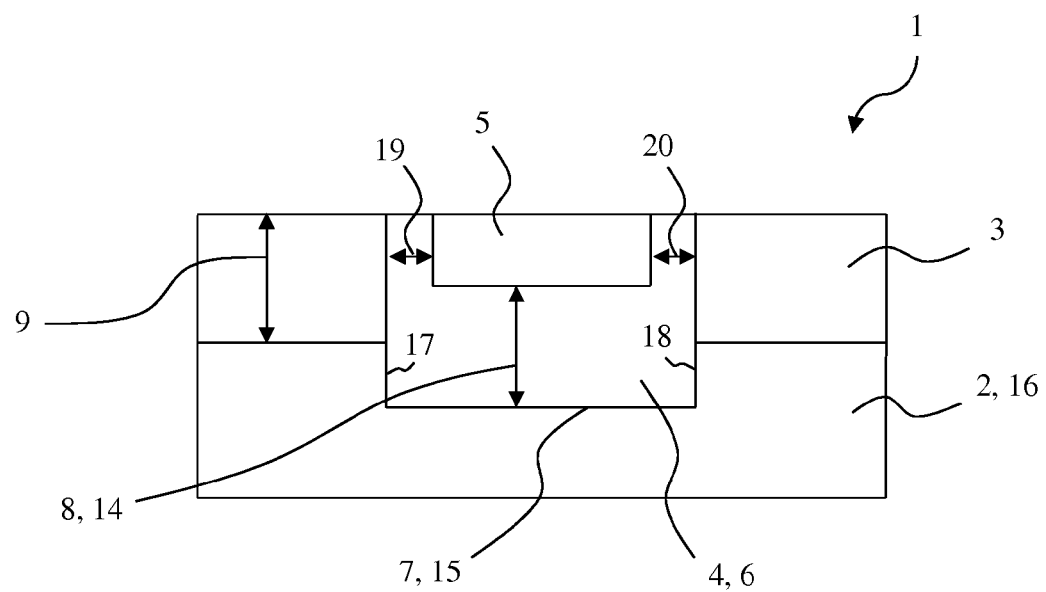
FIG. 3 shows a cross-sectional view of a further device for propagating light.

FIG. 3 shows a cross-sectional view of a further device 1 for propagating light. In contrast to the device 1 shown in FIG. 2 in the device 1 shown in FIG. 3 the waveguide 5 is arranged within the filler material 6. The recess 4 is partly filled with the filler material 6. The recess 4 is formed such that a distance 14 between the waveguide 5 and the interface 15 between the semiconductor material 16 and the filler material 6 is larger than the predetermined distance. Thereby, the predetermined distance is the distance which is necessary to keep the light mode 10 within the area of the filler material 6.

Preferably, the waveguide 5 is arranged such that the distance 19 between the waveguide 5 and the first side wall 17 equals the distance 20 between the waveguide 5 and the second side wall 18. However, arranging the waveguide 5 in the center between the first side wall 17 and the second side wall 18 is not necessary.

Figure 4:
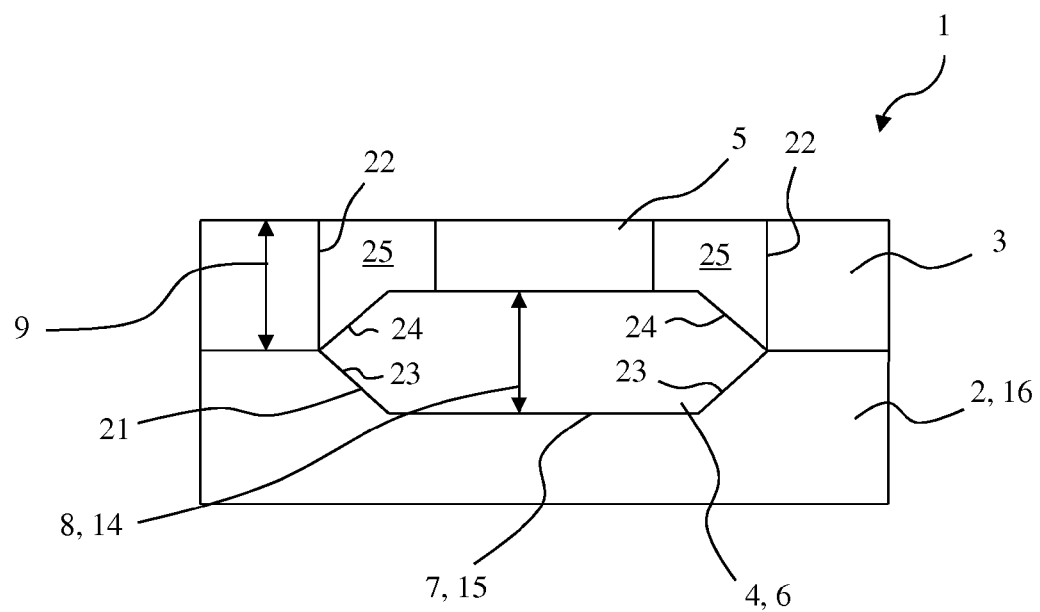
FIG. 4 shows a cross-sectional view of a further device for propagating light.

FIG. 4 shows a cross-sectional view of a further device 1 for propagating light. In contrast to the device 1 depicted in FIG. 3 the device 1 depicted in FIG. 4 shows a recess 4 which has a tapered form 21 in the substrate 2 in a direction from the waveguide 5 towards the substrate 2.

The recess 4 has straight sidewalls 22 in the insulating layer 3. Further, in the substrate 2 the recess 4 has tapered sidewalls 23. The filler material 6 can be a fast grown oxide, which is thermally grown in a dry or wet atmosphere. Therefore, because of the way of depositing the filler material 6, the filler material 6 can provide tapered sidewalls 24 in the insulating layer 3. As can be seen in FIG. 4 the waveguide 5 is arranged on the filler material 6. The remaining areas 25 between filler material 6, insulating layer 3 and waveguide 5 can be filled with the same material as is also used for the insulating layer 3. As mentioned before also the filler material 6 and the material of the insulating layer 3 can be the same.

The tapered form 21 in the substrate 2 is well suited to fit the shape of the light mode 10. Since for the filler material 6, the material of the areas 25 and the material of the insulating layer 3 the same material can be used it is no problem if the light mode 10 reaches into the insulating layer 3 or the areas 25.

Figure 5:
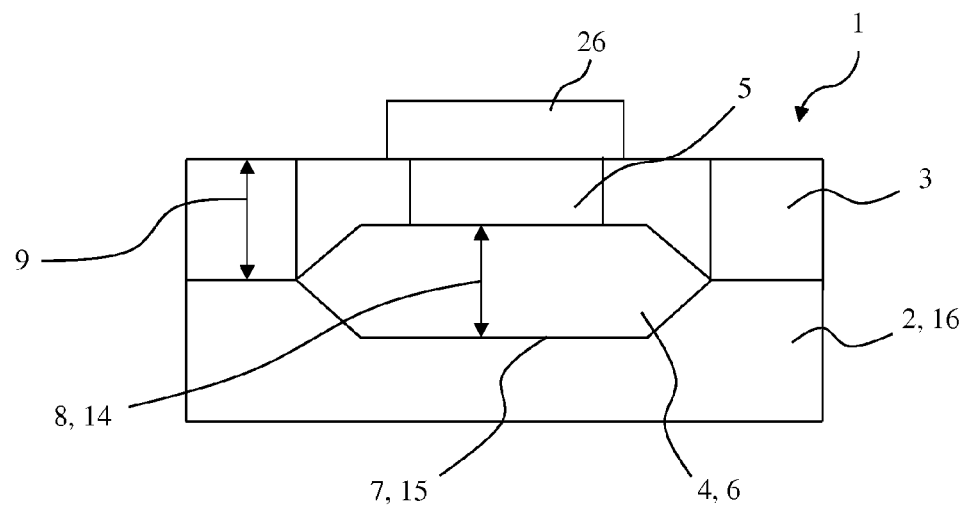
FIG. 5 shows the device of FIG. 4 comprising a further waveguide.

FIG. 5 shows the device 1 of FIG. 4 comprising a further waveguide 26. The further waveguide 26 is arranged above the waveguide 5. When the waveguide 5 and the further waveguide 26 are close to each other adiabatic coupling of light from one waveguide 5, 26 to the other waveguide 26, 5 is possible. In an alternative, the waveguide 5 and the further waveguide 26 are in contact with each other. In a further alternative, there may also be a gap between the waveguide 26 (which can comprise a polymer) and the waveguide 5 (which can comprise silicon). This gap is called "bondline".

In an alternative, the further waveguide 26 can be arranged below the waveguide 5. In this case the waveguide 5 is arranged as depicted in FIG. 2. Further, in this case the further waveguide 26 is then arranged in the filler material 6.

Figure 6:
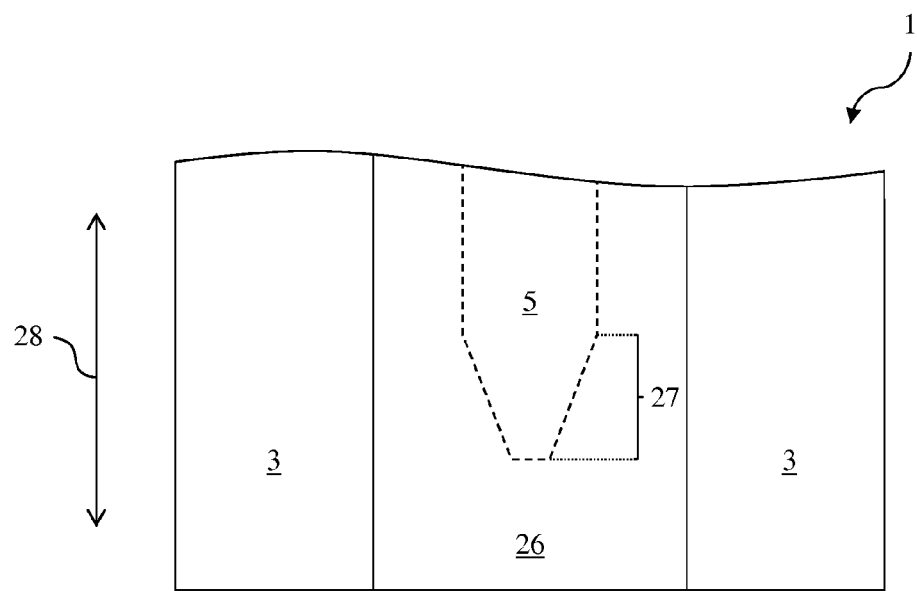
FIG. 6 shows a top view of FIG. 5 with a tapered further waveguide.

FIG. 6 shows a top view of FIG. 5. However, in contrast to FIG. 5 the waveguide 5 of FIG. 6 comprises a tapered section 27. Since the waveguide 5 can not be seen from the top view because of the further waveguide 26, the waveguide 5 is depicted with a dashed line. The waveguide 5 extends in a longitudinal direction 28. In the area where the light adiabatically couples from one waveguide 5, 26 to the other waveguide 26, 5 the waveguides 5, 26 extend in the same direction. Therefore, the further waveguide 26 also extends in the longitudinal direction 28. FIG. 6 shows a situation where light is adiabatically coupled from the waveguide 5 to the further waveguide 26. When the light travels along the waveguide 5 it finally arrives at the tapered section 27. In the tapered section 27 the light mode 10 can't travel as before in the waveguide 5. Therefore, the light will couple to the further waveguide 26.

In an alternative, light is coupled from the further waveguide 26 to the waveguide 5. In this case the further waveguide 26 can comprise a tapered section.

In an alternative, both waveguides 5, 26 may contain tapered sections 27.

Figure 7:
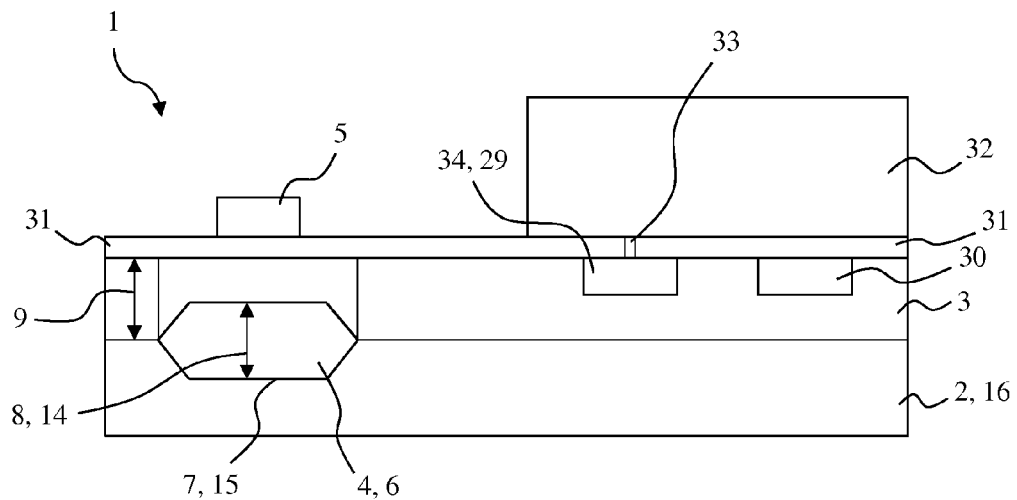
FIG. 7 shows a cross-sectional view of a further device for propagating light.

FIG. 7 shows a cross-sectional view of a further device 1 for propagating light. The insulating layer 3 comprises front-end electronic components 34. As an example a field-effect transistor (FET) 29 is depicted. The front-end-of-line (FEOL) is the first portion of integrated circuit (IC) fabrication where the individual devices (transistors, capacitors, resistors, etc.) are patterned in the semiconductor. The insulating layer 3 can further comprise an additional waveguide 30.

The device 1 can further comprise a passivation layer 31 on top of the insulating layer 3. The passivation layer 31 is also called isolation layer. The passivation layer can comprise silicon nitride. The passivation layer 31 is used to shield the front-end electronic components 34 from the back-end-of-line wiring and contaminants. The back-end-of-line (BEOL) is the second portion of integrated circuit (IC) fabrication where the individual devices (transistors, capacitors, resistors, etc.) get interconnected with wiring on the wafer.

The device 1 can further comprise back-end electronic components 32 which are arranged above the passivation layer 31. Such back-end electronic components are for example structured metal layers. Electrical contacts 33 are used to contact the front-end electronic components 34 with the back-end electronic components 32.

Furthermore, the back-end electronic components 32 can comprise a first interlayer dielectric (ILD1). Between the structured metal layers dielectric layers can be arranged to shield different structured metal layers from each other.

Figure 8:
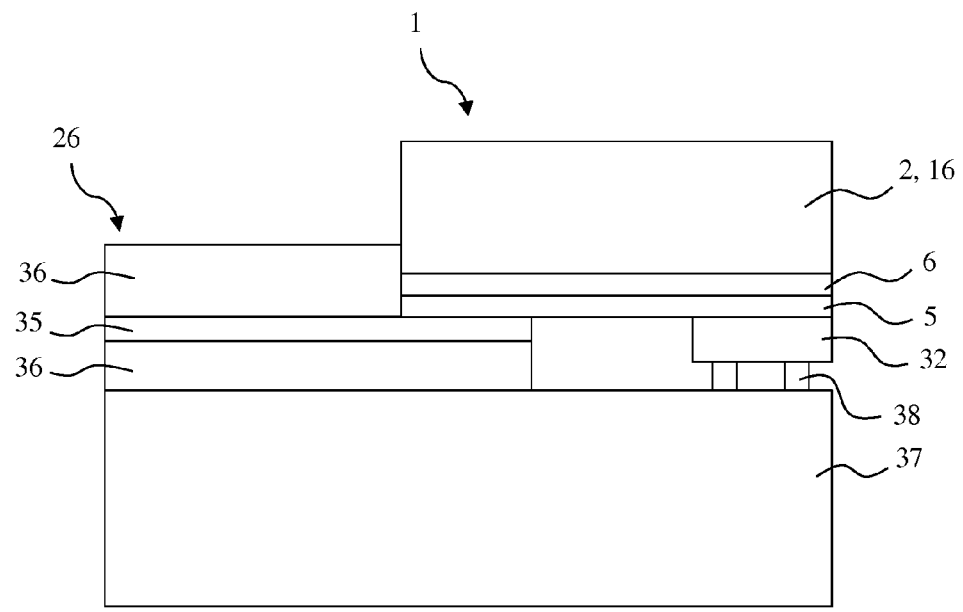
FIG. 8 shows a cross-sectional view of a further device for propagating light coupled to a further waveguide.

FIG. 8 shows a cross-sectional view of a further device 1 for propagating light. The device 1 is coupled to a further waveguide 26. In contrast to, for example FIG. 7, the propagation direction of the light is from left to right or from right to left depending if the light is coupled from the further waveguide 26 to the waveguide 5 or vice versa.

The further waveguide 26 can comprise a waveguide core 35 and a cladding 36. The waveguide core 35 can comprise polysilicon, silicon or a polymer. The waveguide core 35 is in direct contact with the waveguide 5 in the area where the light couples between the two waveguides 5, 26. As can be seen in FIG. 8 the filler material 6 is above the waveguide 5 and above the waveguide 5 is the substrate 2. The device 1 is supported by a carrier 37. The back-end electronic components 32 are in contact with the carrier 37 by coupling structures 38, e.g. C4 solder bumps. The coupling structures 38 can provide mechanical stability and electric contacts.

FIG. 9A to 9I show a method for fabricating a device 1 for propagating light.

Figure 9A:
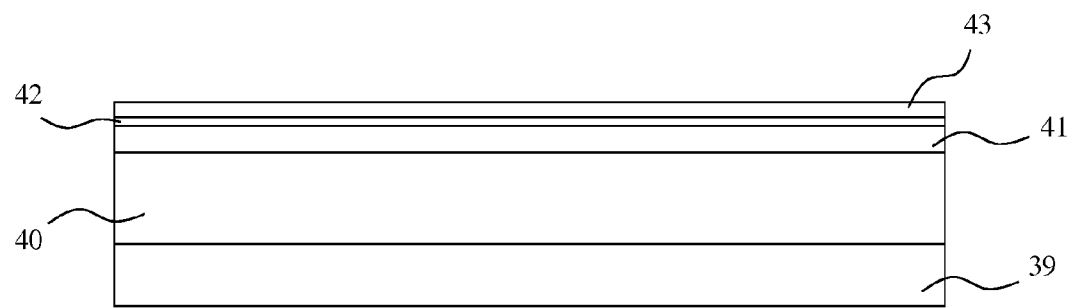
FIG. 9A to 9I show a method for fabricating a device for propagating light.

FIG. 9A shows a step S1 of the method. First a semiconductor on insulator wafer (SOI-wafer) is provided. The SOI-wafer comprises a silicon layer 39, a silicon dioxide layer 40 and a top silicon layer 41 on top of the silicon dioxide layer 40. On the top silicon layer 41 a further silicon dioxide layer 42 is grown. Afterwards a silicon nitride layer 43 is grown on the silicon dioxide layer 42.

Figure 9B:
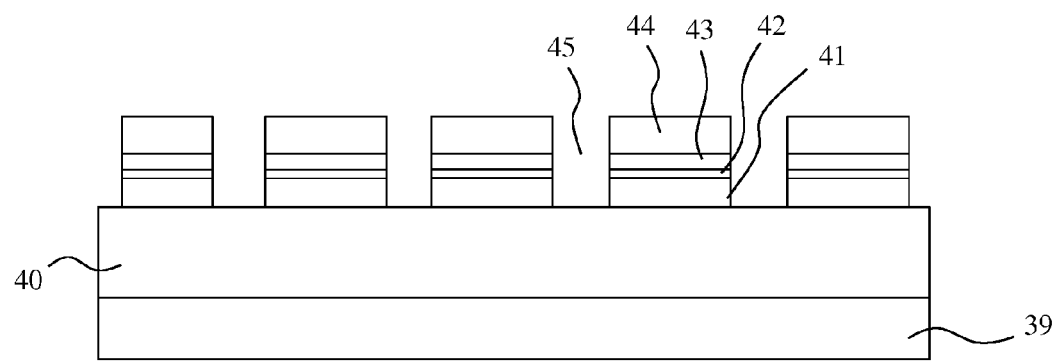

FIG. 9B shows a step S2 of the method. A photoresist 44 is deposited on the silicon nitride layer 43 and lithographically structured. Trenches 45 are etched with the silicon dioxide layer 40 as stop layer.

Figure 9C:
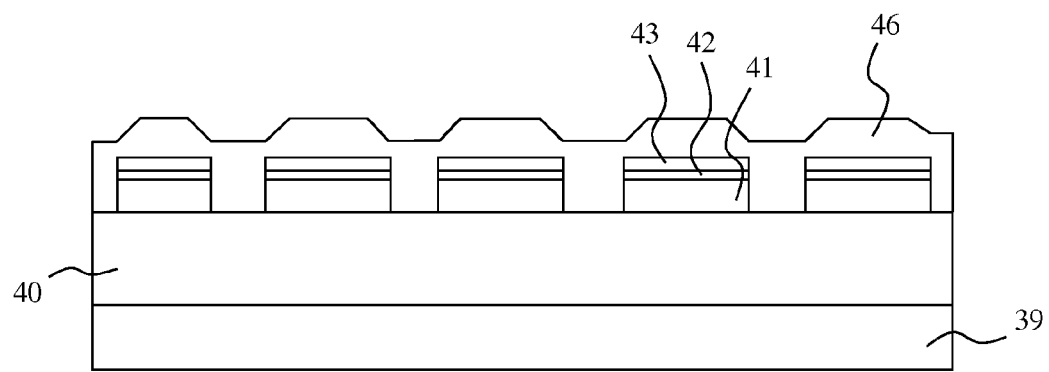

FIG. 9C shows a step S3 of the method. The photoresist 44 is stripped away. The trenches 45 are filled using the shallow-trench isolation (STI) electrical isolation scheme. The STI fill 46 consists of silicon dioxide deposited using a high-density plasma (HDP).

Figure 9D:
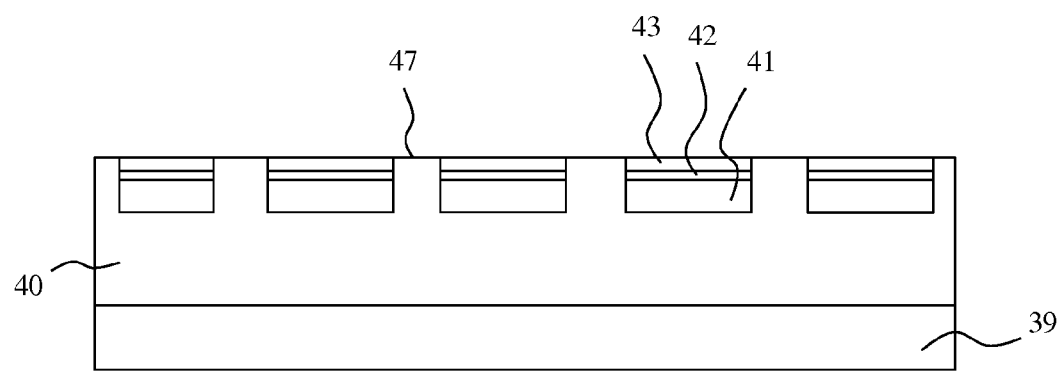

FIG. 9D shows a step S4 of the method. A chemical-mechanical polishing is performed to provide a planar surface 47.

Figure 9E:
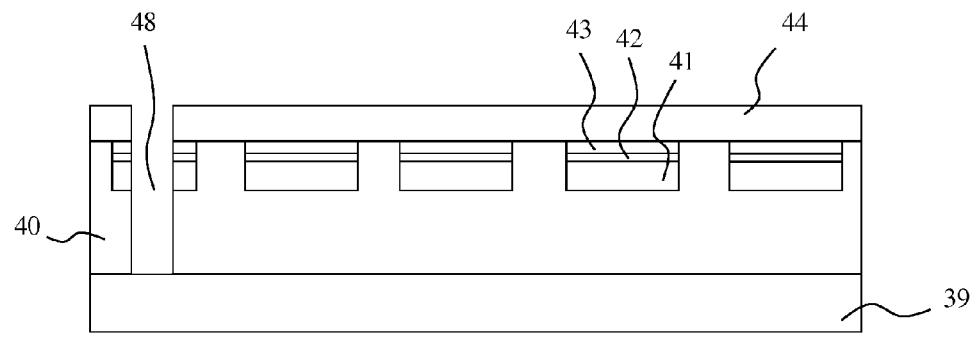

FIG. 9E shows how a body contact can be realized. That means how a contact to the silicon layer 39 is provided. A photoresist 44 is deposited on the planar surface 47 and lithographically structured. Then the via 48 is etched with the silicon layer 39 as the stop layer.

Figure 9F:
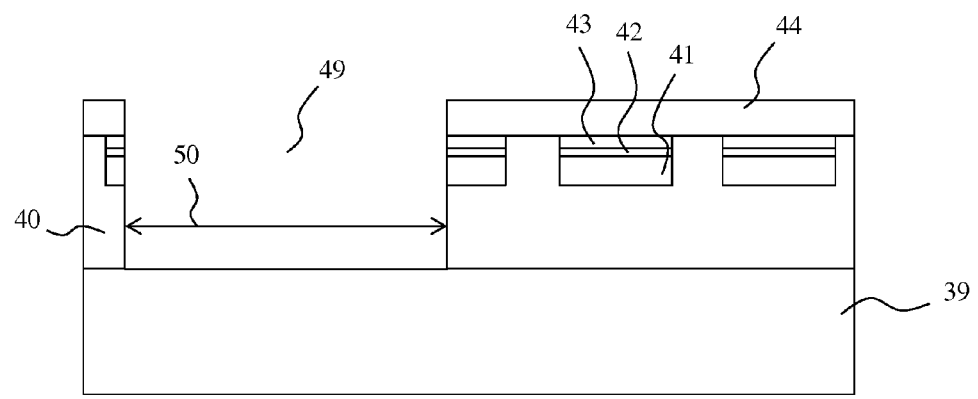

FIG. 9F shows a step S5 of the method which is carried out analog to the realization of a body contact as depicted in FIG. 9E. However, in this case a wider via 49 is etched. The width 50 of the wider via is between 1 to 100 μm, more preferably between 5 and 20 μm.

Figure 9G:
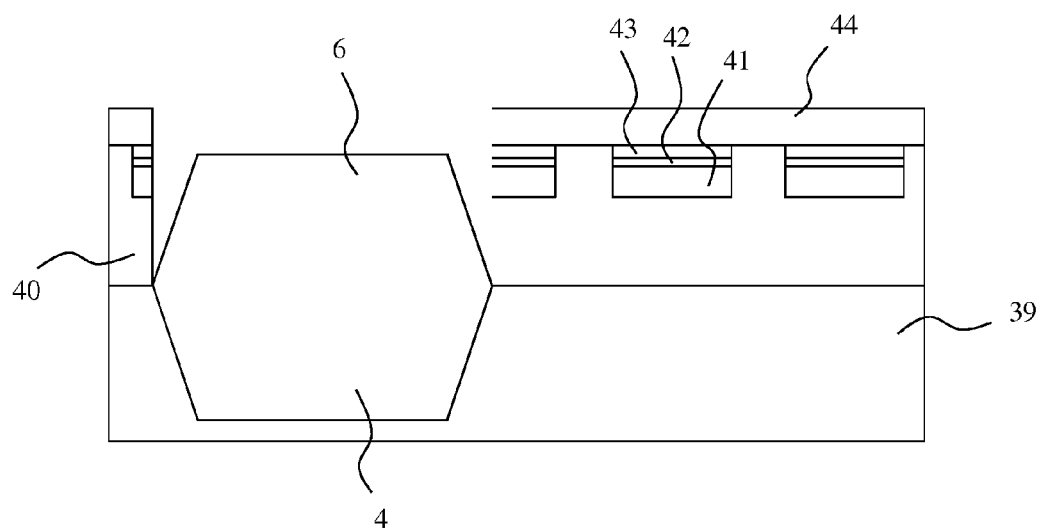

FIG. 9G shows a step S6 of the method. A part of the silicon layer 39 is removed or transformed to provide the recess 4. Afterwards the recess 4 is at least partly filled with the filler material 6. The filler material 6 can be silicon dioxide. Preferably, the filler material 6 is thermally grown in a wet atmosphere. In an alternative, the filler material 6 may be grown through a dry atmosphere at elevated temperatures.

Figure 9H:
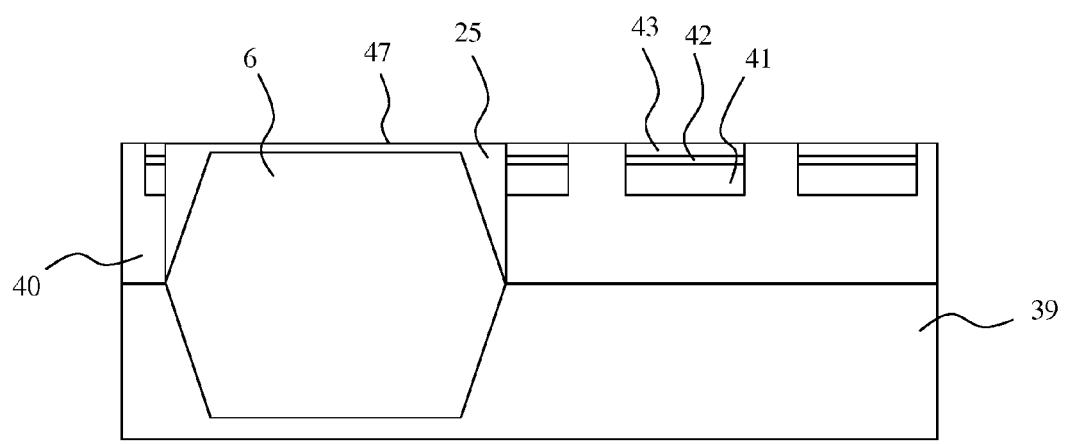

FIG. 9H shows a step S7 of the method. The photoresist 44 is stripped away. Further, the areas 25 between the filler material 6 and the silicon dioxide layer 40 are filled with silicon dioxide. Afterwards a chemical-mechanical polishing is performed to provide a planar surface 47.

Figure 9I:
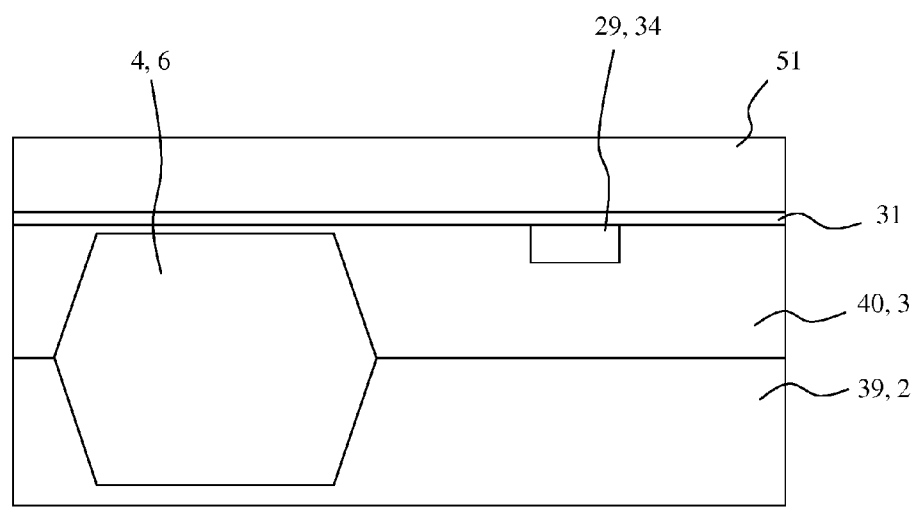

FIG. 9I shows a step S8 of the method. Next the FEOL processing can be performed. After the FEOL processing no other processing steps need to be adjusted or introduced. A passivation layer 31 is then deposited on the silicon dioxide layer 40 which is the insulating layer 3. Further, the BEOL processing is performed. As shown in FIG. 9I an ILD1 51 comprising silicon dioxide is deposited.

Afterwards to finish the fabrication of the device 1 the ILD1 51 has to be removed in the area over the recess 4 and the waveguide 5 has to be arranged on top of the filler material 6.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGNS 1 device
2 substrate
3 insulating layer
4 recess
5 waveguide
6 filler material
7 recess bottom
8 distance between waveguide and recess bottom
9 thickness of the insulating layer
10 light mode
11 radius of the light mode
12 width of the recess
13 area
14 distance between waveguide and interface
15 interface between semiconductor material and filler material
16 semiconductor material
17 first side wall
18 second side wall
19 distance between waveguide and first side wall
20 distance between waveguide and second side wall
21 tapered form
22 straight sidewall
23 tapered sidewall in the substrate
24 tapered sidewall in the insulating layer
25 area
26 further waveguide
27 tapered section 28 longitudinal direction
29 field-effect transistor
30 additional waveguide
31 passivation layer
32 back-end electronic components
33 electrical contacts
34 front-end electronic components
35 waveguide core
36 cladding
37 carrier
38 coupling structure
39 silicon layer
40 silicon dioxide layer
41 top silicon layer
42 silicon dioxide layer
43 silicon nitride layer
44 photoresist
45 trench
46 shallow-trench isolation fill (STI fill)
47 planar surface
48 via
49 wider via
50 width
51 interlayer dielectric 1 (ILD1)
52 cladding
53 top surface
54 side surface

The invention claimed is:

1. A device for propagating light, comprising:
a substrate having a semiconductor material;
an insulating layer, wherein the insulating layer is arranged on the substrate;
a recess formed to penetrate both of a portion of the insulating layer and a portion of the substrate, wherein the recess is at least partially filled with a filler material; and
a waveguide arranged on the filler material,
wherein a bottom surface of the waveguide is coplanar with a top surface of the insulating layer,
wherein the recess has a recess bottom, and a distance between the waveguide and the recess bottom is larger than a thickness of the insulating layer.

2. A device for propagating light, comprising:
a substrate having a semiconductor material;
an insulating layer, wherein the insulating layer is arranged on the substrate;
a recess formed to penetrate both of a portion of the insulating layer and a portion of the substrate, wherein the recess is at least partially filled with a filler material; and
a waveguide arranged on the filler material,
wherein a bottom surface of the waveguide is coplanar with a top surface of the insulating layer,
wherein the recess is formed such that a distance between the waveguide and an interface between the semiconductor material and the filler material is larger than a radius of a light mode of the waveguide.

3. The device of claim 1, wherein the filler material has a lower index of refraction than the substrate.

4. The device of claim 1, wherein the insulating layer is a buried oxide layer.

5. The device of claim 1, wherein the recess has a tapered form in the substrate in a direction from the waveguide towards the substrate.

6. The device of claim 1, wherein a further waveguide is arranged below or above the waveguide for an adiabatic coupling of light between the two waveguides.

7. The device of claim 6, wherein the waveguide extends in a longitudinal direction and the waveguide or the further waveguide is tapered in the longitudinal direction.

8. The device of claim 1, wherein the insulating layer comprises front-end electronic components.

9. The device of claim 1, further comprising a passivation layer on top of the insulating layer.

10. The device of claim 9, further comprising back-end electronic components above the passivation layer.

11. The device of claim 10, wherein the back-end electronic components comprise a first interlayer dielectric (ILD1).

12. The device of claim 1, wherein the filler material and the insulating layer comprise the same material, particularly silicon dioxide, and the substrate comprises silicon.

13. The device of claim 1, wherein the waveguide comprises silicon, polysilicon or a polymer.

* * * * *